Nov. 6, 1962 W. L. TACK 3,061,919
MAGNETIC LOADING METHOD AND APPARATUS
Filed July 13, 1959

*INVENTOR.*
WILLIAM L. TACK
BY
KENWAY, JENNEY, WITTER & HILDRETH
ATTORNEYS 3,061,919
MAGNETIC LOADING METHOD AND
APPARATUS
William L. Tack, Watertown, Mass., assignor to Clevite
Corporation, Cleveland, Ohio, a corporation of Ohio
Filed July 13, 1959, Ser. No. 826,869
3 Claims. (Cl. 29—428)

This invention relates in general to the loading of parts into a fixture and in particular to the threading of magnetizable parts through the apertures of a fixture.

It is common when necessary to form a group of small parts into a composite structure to assemble the parts together with solder or brazing materials between the parts. The assemblies are then subjected to heat in a suitable furnace or oven. Generally, the assemblies are loaded in fixtures sometimes called boats and passed through furnaces on an endless belt. A reducing atmosphere is usually maintained within the furnace to minimize oxidation and facilitate the wetting of parts by the solder or brazing material. The solder or brazing material is melted by the heat, and upon cooling of the assembly, the solder solidifies to form an integral structure.

Loading of the assemblies into fixtures is not usually a difficult process. However, in the fabrication of electronic devices, the handling of parts becomes a serious problem. For example, in the manufacture of semiconductor diodes a relatively small boat may have a capacity of 500 or more elements. The elements are often loaded by hand into apertures formed in the boat. In the case of semiconductor diodes, a so-called first seal is made up of a glass sleeve of about 1/8 inch in diameter, into one end of which a Dumet lead of about $25/1000$ of an inch in diameter is sealed. Dumet leads are, and for many years have been, common in the field of lamp and tube manufacture. These leads include a considerable length of magnetic, that is, magnetizable, material.

Manual loading of 500 or more units of this size into a boat is a time consuming and expensive operation. In fact, time studies have indicated that the loading of a 500-hole boat takes approximately 15 minutes, and this rate is achieved only by experienced operators.

Inasmuch as many of the operations necessary to manufacture semiconductor devices have been and are being accomplished on automatic machinery, the manual loading of first seals into the boat constitutes an intolerable bottleneck.

Figure 1:
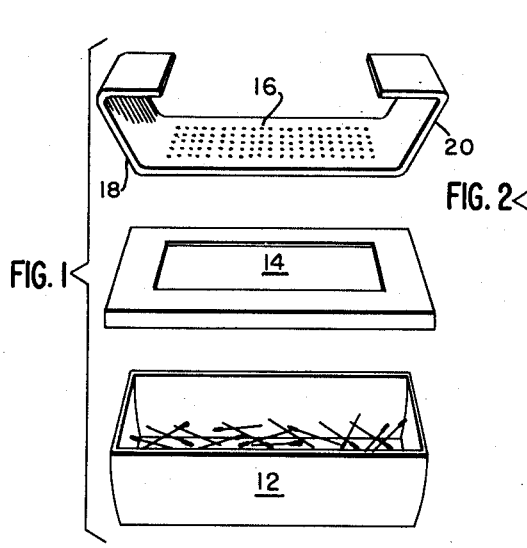
Figure 2:
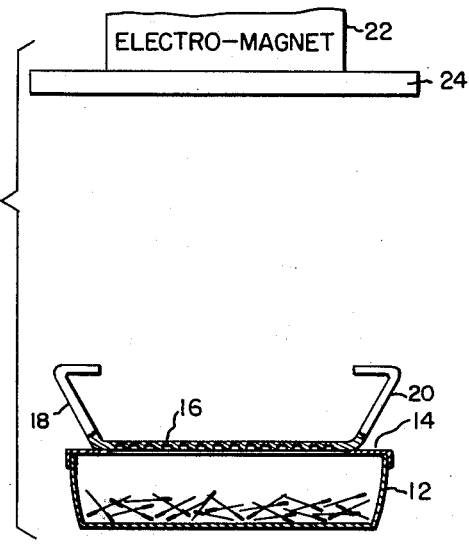
Figure 3:
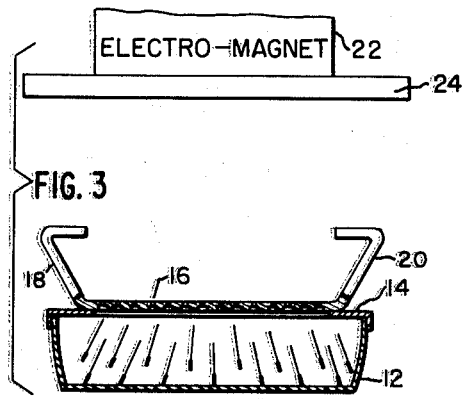
Figure 4:
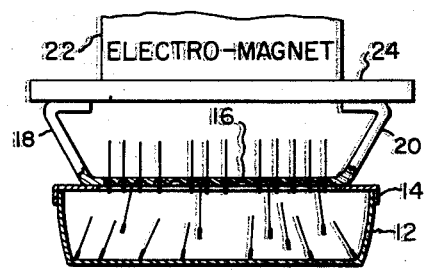
Figure 5:
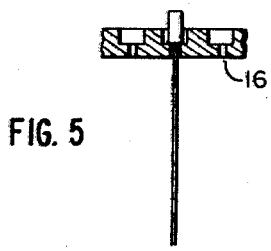

The present invention has as its primary object an increase in efficiency in manufacturing semiconductor devices. The method and apparatus utilized in the attainment of this object are applicable to many other similar loading problems as will become apparent from a reading of the following description of a preferred embodiment of the invention in which:

FIG. 1 is an exploded view of the tray, cover and boat used in connection with the loading of parts, FIG. 2 is a sectional view of the disposition of parts in the first step in the loading operation, FIG. 3 is a sectional view of the second step in the loading operation, FIG. 4 illustrates the final step in the loading operation, and FIG. 5 is a fragmentary sectional view of the boat and a first seal.

In general, the invention is organized about a method and apparatus for producing a magnetic flux field and a fixture for focusing that field in such a manner as to orient and load magnetic objects into the apertures of the fixture. (Parenthetically, it should be noted that the term magnetic as used throughout this application means magnetizable.) In FIG. 1, components suitable for use in applying the invention to the loading of first seals are shown. A tray 12 of non-magnetic material is used as a container for a group of first seals which are distributed in random fashion throughout the tray. For convenience, the tray may be of transparent plastic in order that the first seals may be clearly seen from the outside. A slotted cover 14 is of the proper dimensions to fit fairly snugly over the top of the tray. The slot in the cover is suitably dimensioned to accommodate a loading boat 16. The loading boat is placed in an inverted position upon the slotted cover when it is in use. Two extensions 18 and 20 shown extending upwardly from the boat normally serve as legs for the boat when it is in an upright position.

In FIG. 2, the assembly of the tray 12, the cover 14 and the boat 16 are shown as they might appear upon the bench where the loading of the boat is to take place. Above the assembly is an electromagnet 22 and a steel plate 24 serving as a pole piece for the electromagnet.

In FIG. 3, the action of the flux field of the electromagnet upon the first seals as the assembly is raised toward the electromagnet is shown. The apertured boat breaks the flux field into individual components focused through the respective apertures. As the tray is raised toward the electromagnet, the effect of the flux field upon the first seals is apparent. The Dumet leads are pulled into an upright position and slight agitation of the tray by the operator performing the loading operation expedites the orientation. When the boat is lifted into a position where the legs of the boat 18 and 20 are actually against the steel plate 24, a slight continued agitation causes the magnetic portions, that is the Dumet leads of the first seals, to be drawn through the apertures of the boat where the flux field is strongest, as shown in FIG. 4.

The assembly may then be lowered from the electromagnet, and the field even at some slight distance from the electromagnet is sufficiently strong to retain the first seals in the loaded position. The boat may be removed from the slotted cover and turned over without loss of the seals from the boat until it is in an upright position, after which it may be removed from the area of the flux field or the power to the electromagnet may be removed. Following the loading operation, a solder pellet and a semiconductor die may be dropped into the glass sleeve and upon the end of the Dumet lead. The boat may then be passed through a furnace to melt the solder and join the semiconductor die to the end of the Dumet lead.

At least a part of the material of which the parts to be loaded are made must, of course, be magnetic in order that the flux field may be effective upon them. In the preferred embodiment of the invention shown and described, the tray and cover are preferably of a transparent plastic, but these too may, if desired, be formed of any suitable material. Similarly, the boat may be made of any of numerous materials, the primary criterion being that the material be less magnetizable than the parts to be loaded.

Parts of almost any type and description may be loaded into apertures in the fashion described. In some instances, it may be desirable to utilize a permanent magnet rather than an electromagnet, and in the case of the loading of heavy parts, provision may be made to retain those parts in the fixture to avoid undesired unloading caused by gravity. For that matter, the effects of gravity may be minimized or avoided in some instances by performing the loading operation on a horizontal plane or even by locating the flux field source beneath rather than above the fixture to be loaded. Although a manual loading operation has been described, it is obvious that only simple mechanical components need be added to the invention to perform the function automatically.

What has been described constitutes a preferred embodiment, but the applicability of the invention to the loading of magnetic parts of any kind will be obvious to those skilled in the art. Therefore, the invention should be limited not to the details shown, but only by the spirit and scope of the appended claims.

What is claimed:

1. Apparatus for loading first seals, having an elongated portion of magnetizable material terminating at one end in an enlargement of less magnetizable material, into a fixture comprising: a fixture, of a magnetic material less magnetizable than said first seals, having a plane surface containing an array of apertures smaller than said enlargement of first seals; a tray adapted to contain a plurality of randomly oriented first seals; a slotted cover on said tray, said fixture being removably disposed upon said cover in a position inverted with respect to its normal position; and an electromagnet for generating a flux field, said fixture, tray and cover being adapted for conjoint movement as an assemblage, with the fixture disposed between the tray and the electromagnet, relative to said electromagnet, selectively toward and away therefrom, relative movement of said assemblage toward said electromagnet causing said flux field to be focused through said apertures and the elongated portion of said first seals to be drawn toward and each threaded through a respective one of said apertures.

2. A method for loading objects into apertures contained in a fixture, which objects have an elongated portion of magnetizable material terminating at one end in an enlargement of less magnetizable material, the fixture being of magnetic material less magnetizable than said objects and the apertures therein being smaller than said enlargement of the objects, comprising the steps: assembling the objects in random array at one side of the fixture; generating a magnetic flux field at the opposite side of the fixture focused through the apertures therein; and moving the fixture and objects toward the point of generation of the magnetic flux field to cause effective strengthening of the flux field operative on the array of objects with concomitant uniform orientation and drawing of the elongated portion of said objects into the apertures in the fixture.

3. Apparatus for loading first seals, having an elongated portion of magnetizable material terminating at one end in an enlargement of less magnetizable material, into a fixture, comprising: a fixture, of magnetic material less magnetizable than said first seals, having a plane surface containing an array of apertures smaller than said enlargement of the first seals; a tray adapted to contain a plurality of randomly oriented first seals, said fixture being removably disposable on said tray in a position inverted with respect to its normal position; and an electromagnet for generating a flux field, said fixture and tray being adapted for conjoint movement as an assemblage, with the fixture disposed between the tray and the electromagnet, relative to said electromagnet, selectively toward and away therefrom, relative movement of said assemblage toward said electromagnet causing said flux field to be focused through said apertures and the elongated portion of said first seals to be drawn toward and each threaded through a respective one of said apertures.

References Cited in the file of this patent

UNITED STATES PATENTS

| | | |
|---|---|---|
| 2,503,467 | Blind | Apr. 11, 1950 |
| 2,544,114 | Steinberg | Mar. 6, 1951 |
| 2,641,212 | Meilstrup | June 9, 1953 |
| 2,974,369 | Orthuber et al. | Mar. 14, 1961 |